(12) United States Patent
Jung et al.

(10) Patent No.: US 8,107,222 B2
(45) Date of Patent: Jan. 31, 2012

(54) SUPERCAPACITOR AND MANUFACTURING METHOD THEREOF

(75) Inventors: Hyun-Chul Jung, Yongin-si (KR); Sang-Yool Lee, Suwon-si (KR); Young-Kwan Lee, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 909 days.

(21) Appl. No.: 12/155,538

(22) Filed: Jun. 5, 2008

(65) Prior Publication Data
US 2009/0027828 A1    Jan. 29, 2009

(30) Foreign Application Priority Data
Jul. 23, 2007  (KR) .................. 10-2007-0073593

(51) Int. Cl.
*H01G 9/00*  (2006.01)

(52) U.S. Cl. ........ 361/502; 361/503; 361/504; 361/509; 361/512; 361/517

(58) Field of Classification Search .......... 361/502, 361/503–504, 509–512, 516–519, 303–305, 361/523–528
See application file for complete search history.

(56) References Cited

U.S. PATENT DOCUMENTS

| 6,822,849 | B2 * | 11/2004 | Miki et al. ............... 361/523 |
| 7,457,104 | B2 * | 11/2008 | Lee et al. ............... 361/523 |
| 2008/0003768 | A1 * | 1/2008 | Oh .......................... 438/399 |

FOREIGN PATENT DOCUMENTS

| JP | 409115768 | * 5/1997 |
| JP | 11-283886 | 10/1999 |
| KR | 2003-0063512 | 7/2003 |
| KR | 2004-0081131 | 9/2004 |

OTHER PUBLICATIONS

Korean Office Action issued on Oct. 29, 2008 in corresponding Korean Patent Application No. 10-2007-0073593.
Korean Office Action issued on Apr. 20, 2009 in corresponding Korean Patent Application 10-2007-0073593.

* cited by examiner

*Primary Examiner* — Nguyen T Ha

(57) ABSTRACT

A supercapacitor and a manufacturing method thereof are disclosed. With manufacturing method of Supercapacitor including: arranging a plurality of filters to be spaced at a designated interval apart, forming a first plating layer connecting one end of the filter, forming a second plating layer lengthened along the filter from the first plating layer, polymerizing to form a conductive polymer layer between the second plating layer, and removing the filter, capacitance (C), power (kw) and energy (E) can be increased as the space for absorbing electrons is widened, by making the surface area of an electrode wider than the a general film.

16 Claims, 5 Drawing Sheets

SUPERCAPACITOR AND MANUFACTURING METHOD THEREOF

CROSS-REFERENCE TO RELATED APPLICATIONS

This application claims the benefit of Korean Patent Application No. 10-2007-0073593 filed with the Korean Intellectual Property Office on Jul. 23, 2007, the disclosure of which is incorporated herein by reference in its entirety.

BACKGROUND

1. Technical Field

This invention relates to a supercapacitor and a manufacturing method thereof.

2. Description of the Related Art

Technologies from the various fields have been actively combined together, with customer's strong desire for the realization of small form factor and ubiquitous.

For the realization of this technical desire, the improvement in electricity, electron, communication, electronic material and parts progresses separately or combinatively in various fields, based on research and development of technical improvement and the market prospect.

In these various technologies, especially the manifestation of high-tech for the electronic products of small form factor and actualization of electronic parts using up-to-date materials are possible, for example, the latest digital IC (integrated circuit) chip can provide the power stably as the frequency becomes higher and voltage becomes lower.

Also the need for low impedance decoupling capacitor is getting important to remove switching noise.

There are lots of reports about the technology making a capacitor on IC because a decoupling capacitor can lower impedance as closer to the IC chip.

Also the interest is getting heighten for the electrochemistry capacitor knows as supercapacitor, as the development is growing for electric transports such as electric car, needed strong power in a short time.

With the development of supercapacitor, an attempt to use a conductive polymer as an electrode is increasing. Among many conductive polymers, especially a study for polypyrrole (PPy) is vigorous. PPy is used importantly as the electrode of supercapacitor due to its porosity, good electrical conductivity and fast doping-dedoping properties. Also it is important to make PPy as thin and equally to maximize the ion diffusion.

And to increase an amount of movement of ions, the wide surface is needed because electrochemical processing is performed on the surface of electrode. Nano sized structure with wide surface and good porosity is very suitable for the electrode of supercapacitor.

Recently many studies are in progress using a complex of PPy and CTN on account of wide surface and good porosity of CNT (carbon nano tube). It is reported that a nano sized electrode using PPy and CNT has better capacitance than an existing PPy film. But making CNT dispersion and PPy/CNT electrode is difficult due to its attribute of CNT.

Also there is a problem since the resistance increases when a nano sized conductive polymer is polymerized to an electrode.

SUMMARY

An aspect of the invention provides a supercapacitor and a manufacturing method thereof which provides wider surface and thinner thickness to make electrode easily and get high capacitance on making an electrode using a nano sized conductive polymer.

One aspect of the invention provides a supercapacitor and a manufacturing method thereof including arranging a plurality of filters to be spaced at a designated interval apart, forming a first plating layer connecting one end of the filter, forming a second plating layer lengthened along the filter from the first plating layer, polymerizing to form a conductive polymer layer between the second plating layer, and removing the filter.

The filter may be composed of AAO (anodized aluminum oxide).

At least one of the first and second plating layers may be composed of one chosen from Au, Ag, Ni, Cu and Pt.

Forming the first plating layer is performed at 170 Å-190 Å of an electric current for 10 to 50 min. and the length of the second plating layers may be short than filter.

Polymerizing includes preparing a solution by dissolving 0.025 (Molarity, M)-0.200M pyrrole and 0.1M-0.5M $LiClO_4$ in acetonitrile, filling the solution between the second plating layers, and forming a conductive polymer layer by applying an appropriate voltage to the solution.

The filter, the first plating layer, the second plating layer and the conductive polymer layer may be immersed in an aqueous solution of 1 to 3M sulfuric acid for 0.5 to 1 hour to remove any remained conductive polymer after the conductive polymer layer is formed The conductive polymer layer may be composed with one chosen from polyaniline, polypyrrole and polythiophene.

After the polymerizing, the method may further include forming a supporting layer on the lower part of the first plating layer. Forming the supporting layer includes; preparing a mixture including 150-300 parts by weight of xylene and 100 parts by weight of chlorinated polypropylene, melting the mixture at 70 to 135° C., and adhering the melted mixture on the lower part of the first plating layer.

Removing the filter may be performed by immersing the filter, the first plating layer, the second plating layer and the conductive polymer layer in 5 to 10 wt % of an aqueous sodium hydroxide solution for 0.5-12 hours.

Another aspect of the invention provides a supercapacitor including a first metal layer; a plurality of second metal layers protruded on the surface of the first metal layer, a conductive polymer layer filled in between the second metal layers in particular intervals.

At least one of the first and second metal layers may be composed with one chosen from Au, Ag, Ni, Cu and Pt.

The conductive polymer layer may be composed with one chosen from polyaniline, polypyrrole and polythiophene and be T shape.

Further, the supercapacitor may further include a supporting layer formed on the lower part of the first metal layer.

Additional aspects and advantages of the present invention will be set forth in part in the description which follows, and in part will be obvious from the description, or may be learned by practice of the invention.

DETAILED DESCRIPTION

Figure 1:
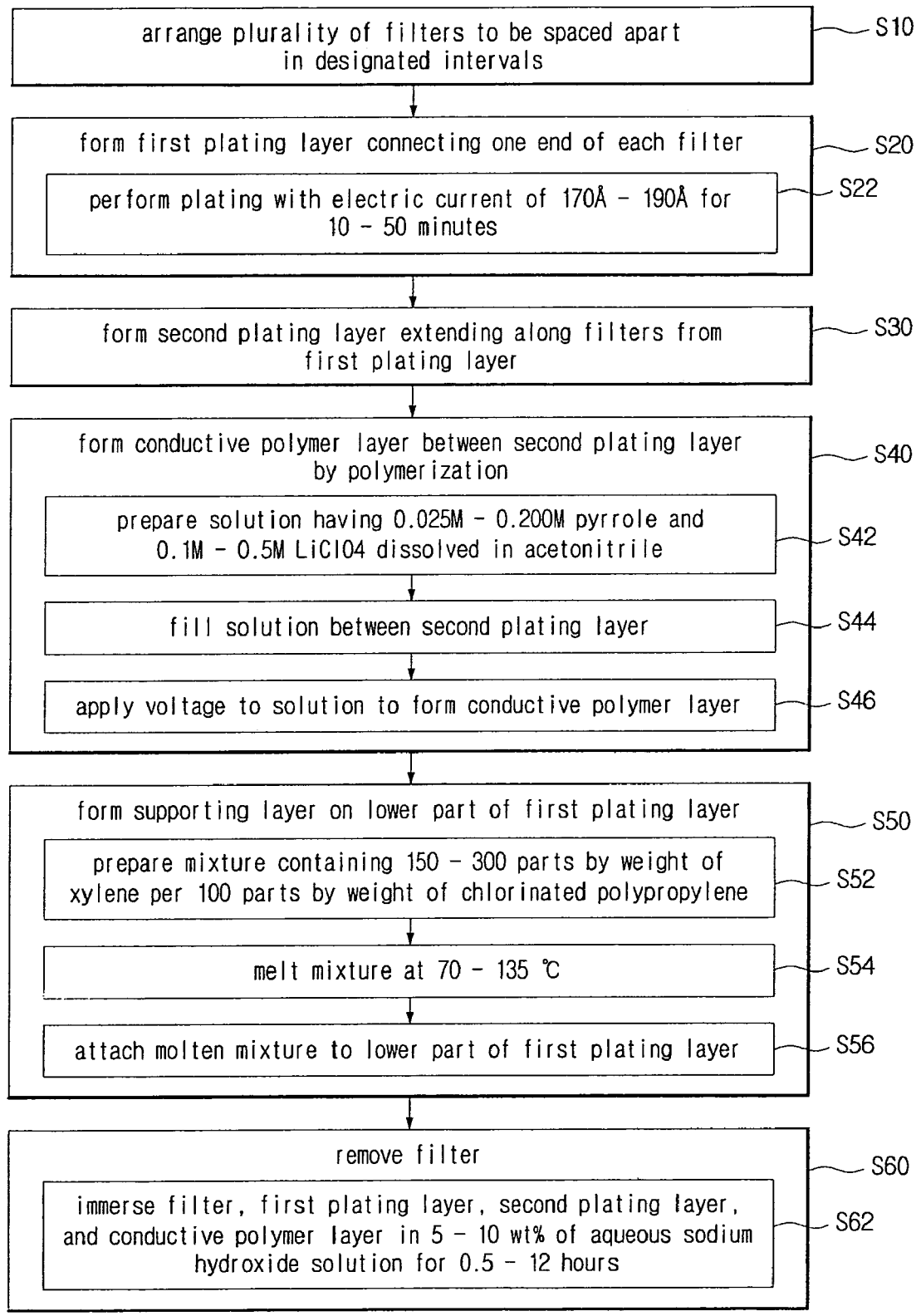
FIG. 1 is a flowchart for a method of manufacturing a supercapacitor according to an embodiment of the present invention.

Certain embodiments of the invention will be described below in more detail with reference to the accompanying drawings. Those components that are the same or are in correspondence are rendered the same reference numeral regardless of the figure number, and redundant explanations are omitted.

Figure 2A:
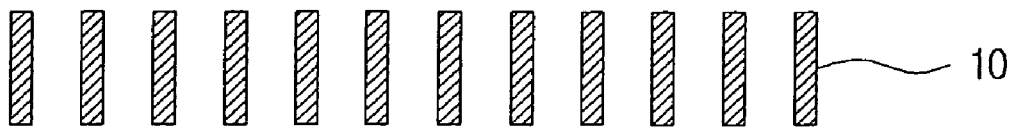
FIG. 2A, FIG. 2B, FIG. 2C, FIG. 2D, FIG. 2E, and FIG. 2F illustrate a method of manufacturing a supercapacitor according to an embodiment of the present invention.
Figure 2B:
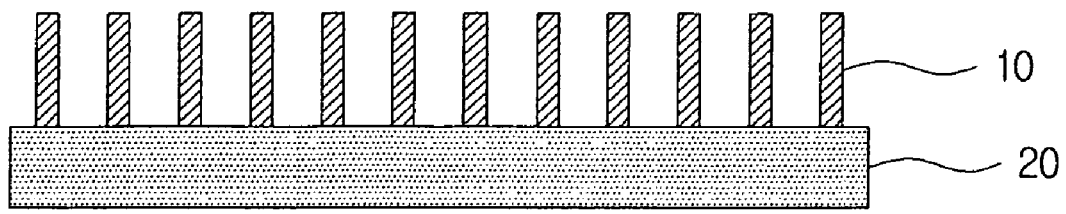
Figure 2C:
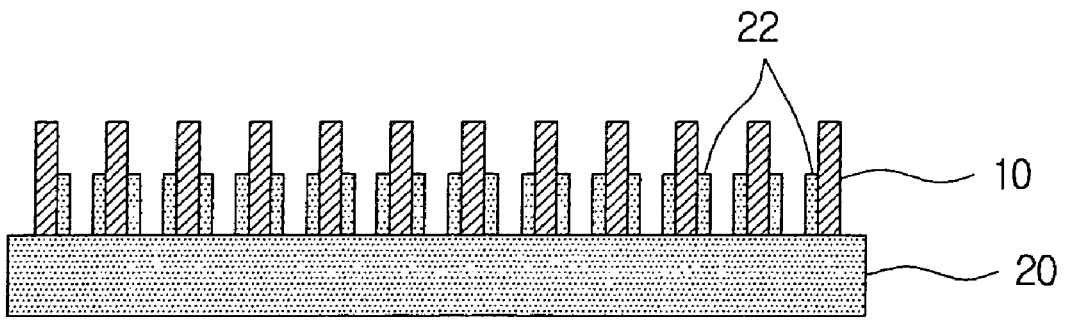
Figure 2D:
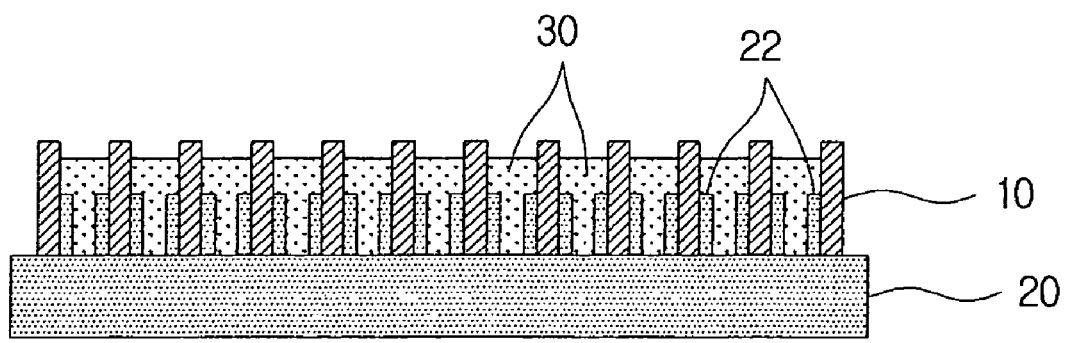
Figure 2E:
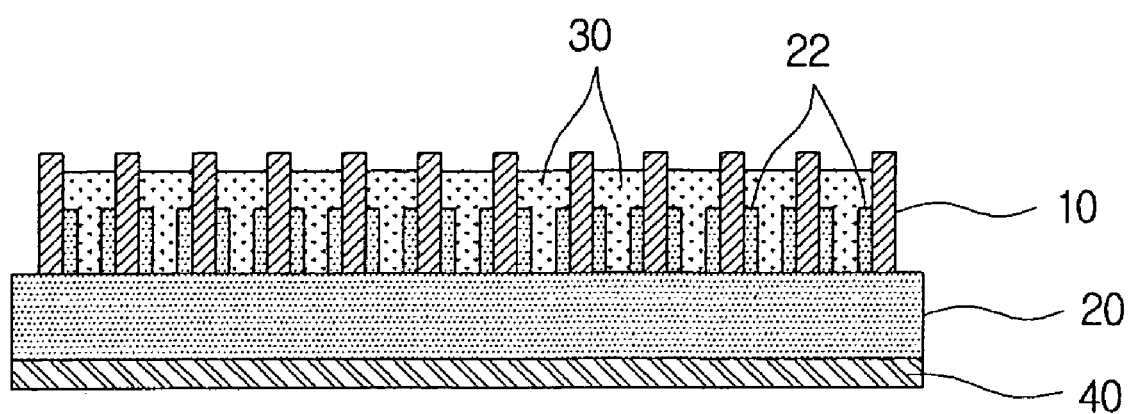
Figure 2F:
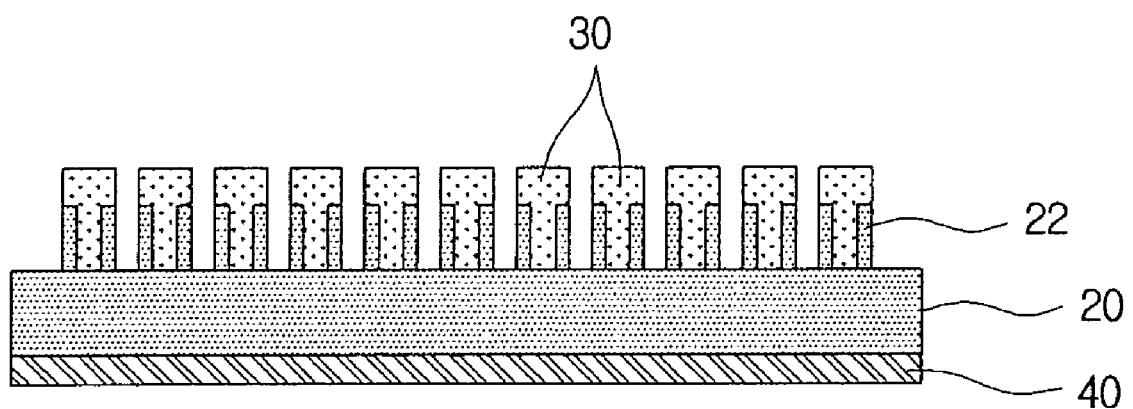

FIG. 1 is a flowchart for a method of manufacturing a supercapacitor according to an embodiment of the present invention, FIG. 2A, FIG. 2B, FIG. 2C, FIG. 2D, FIG. 2E, and FIG. 2F illustrate a method of manufacturing a supercapacitor according to an embodiment of the present invention. In FIG. 1 to 2F, there are illustrated a filter 10, a first plating layer 20, a second plating layer 22, a conductive polymer layer 30, a supporting layer 40.

According to an embodiment of the present invention, is provided a supercapacitor with wide surface and thin thickness as manufacturing a nano sized PPy/Au element electrode, which can be used for supercapacitor by using a conductive polymer, PPy, as an electrode and AAO (anodized aluminum oxide).

Firstly, a plurality of filters are arranged to be spread at a designated interval apart as illustrated in FIG. 2A (S10). The filter 10 may be composed of AAO (anodized aluminum oxide) and materialized porous and insulated type. Also for the electric polymerization of Au and pyrrole inside the filter 10, an electric current may be flow on one side of the filter since the AAO filter 10 is an insulator.

For this, the first plating layer 20 connecting one end of the filter 10 is formed as illustrated in FIG. 2B (S20). The first plating layer 20 may be formed at 170 Å-190 Å electric current for 10-50 min (S22). At this time, the first plating layer 29 can be plated with Au, Ag, Ni, Cu or Pt.

If the electric current is less than 170 Å and the plating time is less than 10 min., the plating layer may not be formed, while if the electric current exceeds 190 Å and the plating time is more than 50 min., the plating may be impossible caused of high current.

Accordingly, an electric current filter can be formed by the vacuum deposition of the first plating layer 20 to the one end of filter 10.

Next, the second plating layer 22 lengthened along the filter 10 from the first plating layer 20 is formed as illustrated on FIG. 2C (S30). The interface adhesive strength between the second plating layer 22 and PPy, a conductive polymer layer 30 to be described later can be improved when the conductive polymer layer 30 is polymerized between the filters 10 as electrolysis plating the second plating layer 22 between the filters 10.

The electrolysis plating can be performed using a plating solution of acid gold and conducted until the electric charge is 3 C by applying continually a constant voltage of −0.9V.

Figure 3:
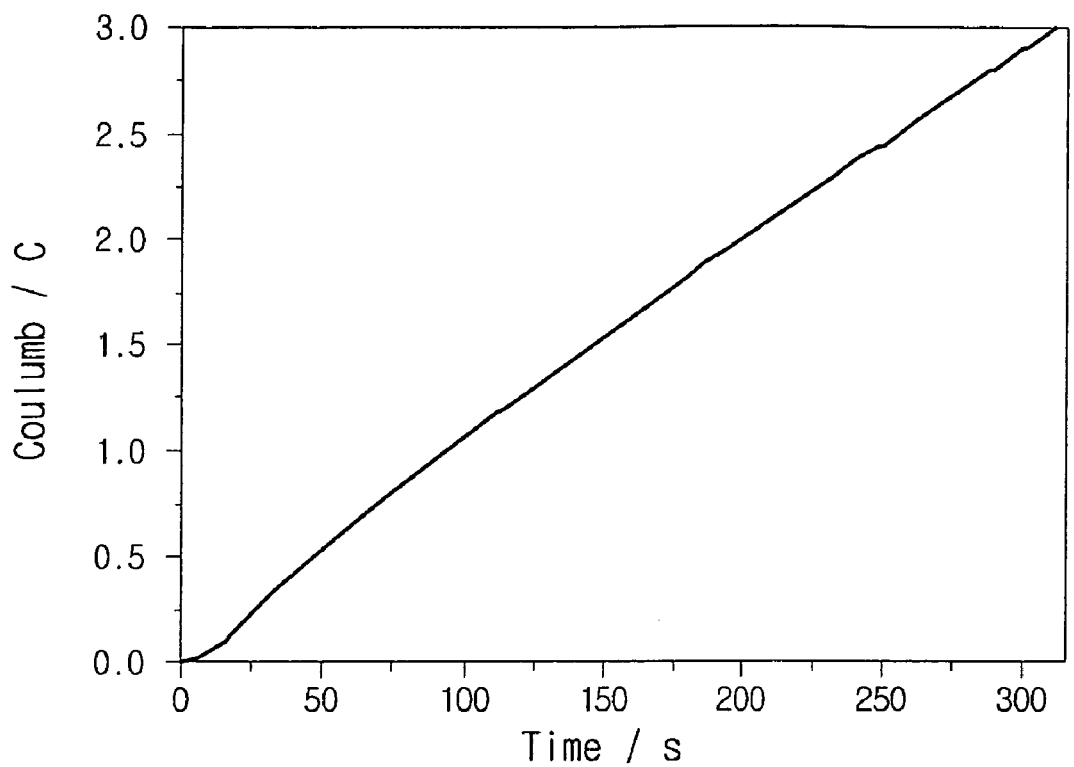
FIG. 3 is a graph illustrating the state of electrolysis plating of the second plating layer according to an embodiment of the present invention.

FIG. 3 is a graph illustrating the state of the electrolysis plating of the second plating layer according to an embodiment of the present invention. As shown in the graph of FIG. 3, the amount of electric charge increases regularly as time goes, it means that the second plating layer 22, which is Au, inside the AAO/Au electrode grows steadily.

Au, grows about 2 μm., Au becomes a hollow tube type by growing along the AAO wall.

Also the short projection of the second plating layer 22 can be made on the both sides of the filter 10 by forming the second plating layer 22 to be shorter than the filter 10. With the above formation, capacitance can be increased by widening the surface of the conductive polymer layer 30 when the filter 10 is removed.

The conductive polymer layer 30 is formed between the second plating layer 22 by the polymerization as illustrated on FIG. 2D (S40). The polymerization includes preparing a solution by dissolving 0.025M-0.200M pyrrole and 0.1M-0.5M $LiClO_4$ in acetonitrile (S42), filling the solution between the second plating layers 22 (S44), and polymerizing a monomer to a polymer by applying an appropriate voltage to the solution to form the conductive polymer layer 30 (S46).

On this embodiment the monomer is pyrrole and the electric polymerized polymer is polypyrrole.

Pyrrole is polymerized inside the AAO/Au electrode using an appropriate voltage of 0.8V, give a voltage until the electric charge becomes 1 C.

Figure 4:
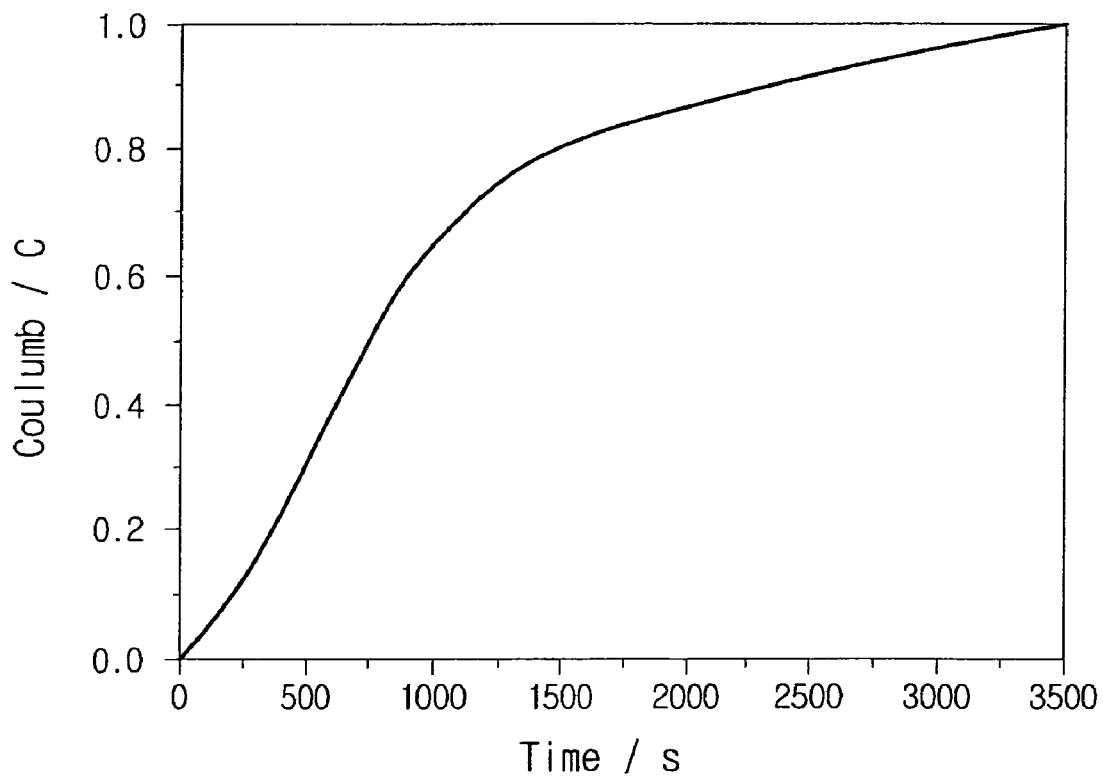
FIG. 4 is a graph illustrating the state of electric polymerizing of conductive polymer layer according to an embodiment of the present invention.
Figure 6:
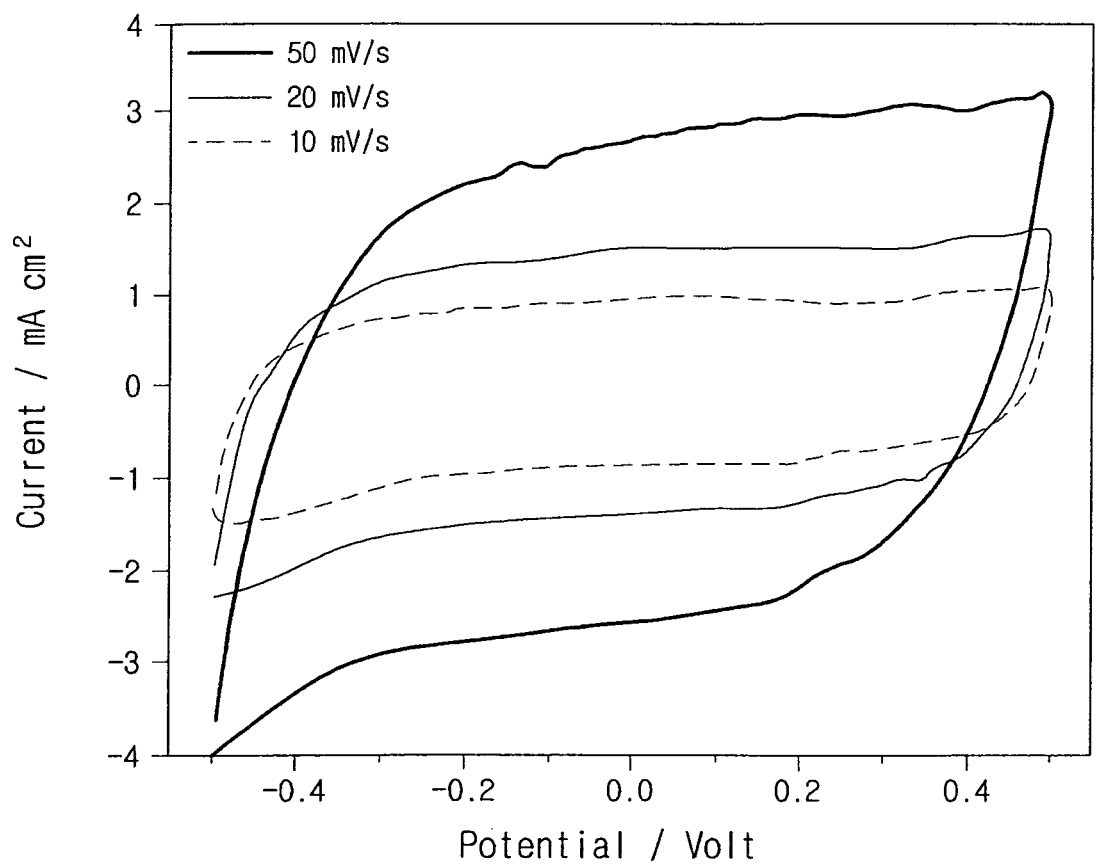
FIG. 6 is a graph illustrating the state of cyclic voltammogram of PPy/Au element according to an embodiment of the present invention.

FIG. 4 is a graph illustrating the state of the electric polymerization of the conductive polymer layer according to an embodiment of the present invention. As shown in FIG. 6, it is noted that an increase of coulomb is getting decreased from around 1000 s.

Before 1000 sec, it shows the increase of electric charge when pyrrole is polymerized inside Au, grown in a hollow tube type along the AAO wall. After 1000 s, it shows the increase of electric charge when pyrrole is polymerized above the Au tube after filling up inside the Au tube.

It is shown that the second plating layer-Au 22 grows about 2 μm and pyrrole is polymerized on it uniformly. Weight of polymerized pyrrole is 0.25 to 0.30 $mg/cm^2$.

The conductive polymer layer 30 may be composed of one chosen from polyaniline, polypyrrole and polythiophene.

The filter 10, the first plating layer 20, the second plating layer 22 and the conductive polymer layer 30 are immersed in an aqueous sulphuric acid solution of 1M-3M for 0.5-1 hour to remove remained conductive monomer, pyrrole, after forming the conductive polymer layer.

A supporting layer 40 is then formed on the lower part of the first plating layer 20 as illustrated in FIG. 2E (S50). Therefore, when the filter is removed, mechanical property of the polypyrrole and Au element can be improved.

The supporting layer 40 is formed by preparing a mixture of 150-300 parts by weight of xylene and 100 parts by weight of chlorinated polypropylene (S52), melting this mixture at 70-135° C. (S54), and adhering this melted mixture on the lower part of the first plating layer 20 (S56).

If temperature is lower than 70° C., the mixture may not be melted sufficiently, while if it is higher than 135° C., xylene may be evaporated.

When the supporting layer 40 is formed, a nickel wire may be inserted between the PPy/Au element and gel to flow an electric current to the element and the gel can dried at the normal temperature for 12 hour.

It is shown that before removing the AAO, the supporting layer 40 is formed on the first plating layer 20.

When a mixture in a gel state realizing the supporting layer 40 becomes harden by drying, as illustrated in FIG. 2F, the PPy/Au element electrode with wide surface is provided by removing the filter 10.

The filter 10 is removed by immersing the filter 10, the first plating layer 20, the second plating layer 22 and the conductive polymer layer 30 in 5-10% of an aqueous sodium hydroxide solution for 0.5-12 hours (S62). The formed PPy/Au element is wash with excess amount of distilled water.

If sodium hydroxide is out of the range, a work environment may be dangerous.

After removing the filter, AAO, it is noted that the PPy/Au with uniform size is arranged with a constant space.

A length of the PPy/Au is 3 μm of which 2 μm is a grown gold and 1 μm is a pyrrol polymerized thereon.

It looks as a bar shape filled with pyrrol of which a diameter is 300 to 350 nm. The ratio of length and height is 8.6 to 10. It is noted in a SEM picture that the surface of the PPy/Au element is wider than that of a general film. So, due to the wider space accepting electrons, capacitance, power and energy can increase.

Figure 5:
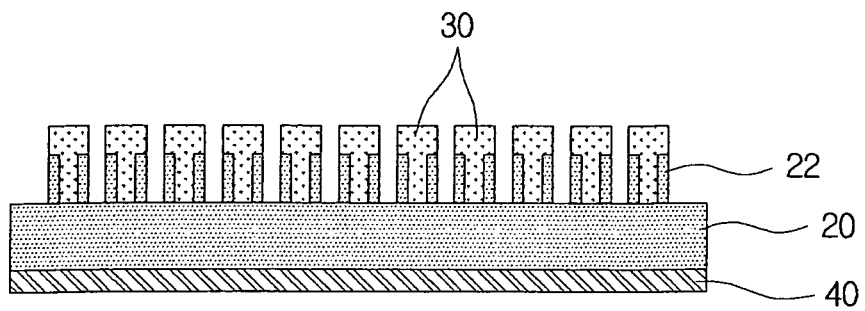
FIG. 5 is a cross-sectional view illustrating a supercapacitor according to an embodiment of the invention.

FIG. 5 is a cross-sectional view illustrating a supercapacitor according to an embodiment of the invention. As illustrated in FIG. 5, there are illustrated the first metal layer 20, the second metal layer 22, the conductive polymer layer 30, and the supporting layer 40.

On this embodiment, the first metal layer 20 is the same as the first plating layer 20 described above and the second metal layer 22 has the same effect as the second metal layer 22 described above.

At least one of the first metal layer 20 and the second metal layer 22 may be composed of one chosen from Au, Ag, Ni, Cu and Pt.

And, the conductive polymer layer 30 may be composed of one chosen from polyaniline, polypyrrole and polythiophene and have a larger surface than a general film by manufacturing in T shape.

FIG. 6 is a graph illustrating the state of cyclic voltammogram characteristics of a PPy/Au element according to an embodiment of the present invention.

Capacitance (C) may be determined by employing a graph of the cyclic voltammogram to the following Equation 1 and that of the PPy/Au element obtained thereby is 56 to 90 mF/cm2, 190 to 300 F/g capacitance, $$C = \frac{I}{S}$$ [Equation 1]

wherein C is capacitance, I is current, and S is change speed of voltage (V/s).

When the change speed of voltage is lower, it is closer to a rectangular shape, while when it is higher, the rectangular shape becomes deteriorated since when the change speed of voltage is higher, the polymer, PPy/Au element, gets oxidized.

Then, condenser characteristics of the PPy/Au element may be determined by employing the galvanostatical method repeating on/off of current.

$$C = \int i \frac{dt}{dv}$$ [Equation 2]

wherein C is capacitance, i is constant current, dt is time as change voltage.

Coulombic efficiency (n) may be determined by employing Equation 3 and current applied time, current cut time, $$\eta = \frac{t_d}{t_c} \times 100\%$$ [Equation 3]

wherein $t_c$ is current applied time, $t_d$ is current cut time.

The condenser made of pyrrol usually exhibits 100% of efficiency.

The capacitance obtained by employing Equation 2 is 59 to 99 mF/cm2 and 183 to 306 F/g. The coulombic efficiency (n) obtained by employing Equation 3 is 92 to 96%, almost 100%. The power and the energy are 41 to 69 Wh/kg and 3.5 to 10.6 kW/kg, respectively.

According to certain aspects of the invention as set forth above, an supercapacitor and manufacturing method thereof can increase capacitance (C), power (kw) and energy (E) as the space for absorbing electrons is widened, by making surface area of PPy/Au element wider than the a general film.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention. As such, many embodiments other than those set forth above can be found in the appended claims.

What is claimed is:

1. A manufacturing method of a supercapacitor, the method comprising:
   arranging a plurality of filters to be spaced at a designated interval apart;
   forming a first plating layer connecting one end of filter;
   forming a second plating layer lengthened along the filter from the first plating layer;
   polymerizing to form a conductive polymer layer between the second plating layer; and
   removing the filter.

2. The method of claim 1, wherein the filter is composed of anodized aluminum oxide (AAO).

3. The method of claim 1, wherein at least one of the first and second plating layers is composed of one selected from the group consisting of Au, Ag, Ni, Cu and Pt.

4. The method of claim 3, wherein the forming the first plating layer is performed at 170 A-190 A electric current for 10-50 min.

5. The method of claim 1, wherein the length of the second plating layers is short than that of the filter.

6. The method of claim 1, wherein the polymerizing comprises:
   preparing a solution by dissolving 0.025M-0.200M pyrrole and 0.1M-0.5M $LiClO_4$ in acetonitrile:
   filling the solution between the second plating layers; and
   forming a conductive polymer layer by applying an appropriate voltage to the solution.

7. The method of claim 6, further comprising, after the forming a conductive polymer layer, the filter, the first plating layer, the second plating layer and the conductive polymer layer is immersed in an aqueous sulphuric acid solution of 1M-3M for 0.5-1 hour.

8. The method of claim 1, wherein the conductive polymer layer is composed of one selected from the group consisting of polyaniline, polypyrrole and polythiophene.

9. The method of claim 1, further comprising, after the polymerizing, forming a supporting layer on the lower part of the first plating layer.

10. The method of claim 9, wherein the forming a supporting layer comprises;
preparing a mixture of 150-300 parts by weight of xylene and 100 parts by weight of chlorinated polypropylene;
melting the mixture at a temperature of 70 to 135° C.;
adhering the melted mixture on the lower part of the first plating layer.

11. The method of claim 1, wherein the removing the filter is performed by immersing the filter, the first plating layer, the second plating layer and the conductive polymer layer in 5-10% of an aqueous sodium hydroxide solution for 0.5-12 hours.

12. A supercapacitor comprising:
a first metal layer;
a plurality of second metal layers protruded on the surface of the first metal layer such that the plurality of second metal layers are separated from one another; and
a conductive polymer layer filled in every other space defined between the second metal layers in designated intervals.

13. The supercapacitor of claim 12, wherein at least one of the first and second metal layers is composed of one selected from the group consisting of Au, Ag, Ni, Cu and Pt.

14. The supercapacitor of claim 12, wherein the conductive polymer layer is composed of one selected from the group consisting of polyaniline, polypyrrole and polythiophene.

15. The supercapacitor of claim 12, wherein the conductive polymer layer is T shape.

16. The supercapacitor of claim 12, further comprising, a supporting layer formed on the lower part of the first metal layer.

* * * * *